(12) United States Patent
Gerald, Sr.

(10) Patent No.: US 6,299,243 B1
(45) Date of Patent: Oct. 9, 2001

(54) VEHICLE WITH AN ADJUSTABLE ROOF

(76) Inventor: William F. Gerald, Sr., 2317 Shirley Dr., Savannah, GA (US) 31404

( * ) Notice: Subject to any disclaimer, the term of this patent is extended or adjusted under 35 U.S.C. 154(b) by 0 days.

(21) Appl. No.: 09/591,062

(22) Filed: Jun. 9, 2000

(51) Int. Cl.[7] ................ B60J 7/02; B60J 7/11; B60J 7/057
(52) U.S. Cl. .............. 296/210; 296/100.03; 296/100.06; 296/100.1; 296/183
(58) Field of Search ................. 296/210, 146.8, 296/56, 100.03, 100.1, 100.06, 26.06, 183

(56) References Cited

U.S. PATENT DOCUMENTS

| | | |
|---|---|---|
| D. 109,521 | 5/1938 | Nicol . |
| 2,602,693 | 7/1952 | Murphy . |
| 3,186,756 | 6/1965 | Saut et al. . |
| 3,542,417 * | 11/1970 | Mohs ................... 296/146 |
| 3,731,968 | 5/1973 | Duffield . |
| 4,184,709 * | 1/1980 | Kim ..................... 296/137 |
| 4,261,613 | 4/1981 | Alford . |
| 4,462,631 | 7/1984 | Lange . |
| 4,620,743 * | 11/1986 | Eke ..................... 296/146 |
| 4,630,858 * | 12/1986 | Bez ..................... 296/146 |
| 4,758,038 * | 7/1988 | Okada ................... 296/26 |
| 4,932,713 * | 6/1990 | Kubota .................. 296/146 |
| 4,932,717 * | 6/1990 | Swann ................... 296/216 |
| 5,997,072 * | 12/1999 | Parkinson ............. 296/146.8 |
| 6,113,177 * | 9/2000 | Parkinson ............... 296/151 |

FOREIGN PATENT DOCUMENTS

| | | | |
|---|---|---|---|
| 363141823A * | 6/1988 | (JP) | ............. 296/146.6 |
| 363159131A * | 7/1988 | (JP) | ............. 296/146.6 |

* cited by examiner

*Primary Examiner*—Joseph D. Pape
*Assistant Examiner*—Greg Blankenship

(57) ABSTRACT

A vehicle with an adjustable roof for providing a vehicle with enhanced capacity by permitting adjustment of the position of the roof of the vehicle. The vehicle with an adjustable roof includes an enhanced transport vehicle system, which comprises a vehicle having a front and a rear. The vehicle has a body including a cab portion located toward the front of the vehicle. The cab portion has a roof section. The body also includes a cargo portion extending rearwardly from the cab portion. The cargo portion has a floor and a pair of laterally spaced side walls extending upwardly in a substantially perpendicular orientation to the floor. The floor has a rear end, and the cargo portion has a roof section extending rearwardly from the roof section of the cab portion to a rear edge of the roof section. The side walls have upper edges extending substantially parallel to each other, and the upper edge of the side walls extend rearwardly from the rear edge of the roof section of the cargo portion. A roof portion is mounted on the cargo portion of the vehicle, and the roof portion has a front edge, a rear roof edge, and opposite lateral side edges extending between the front edge and rear roof edge. The roof portion is pivotable with respect to the roof section of the cargo portion of the vehicle.

10 Claims, 2 Drawing Sheets

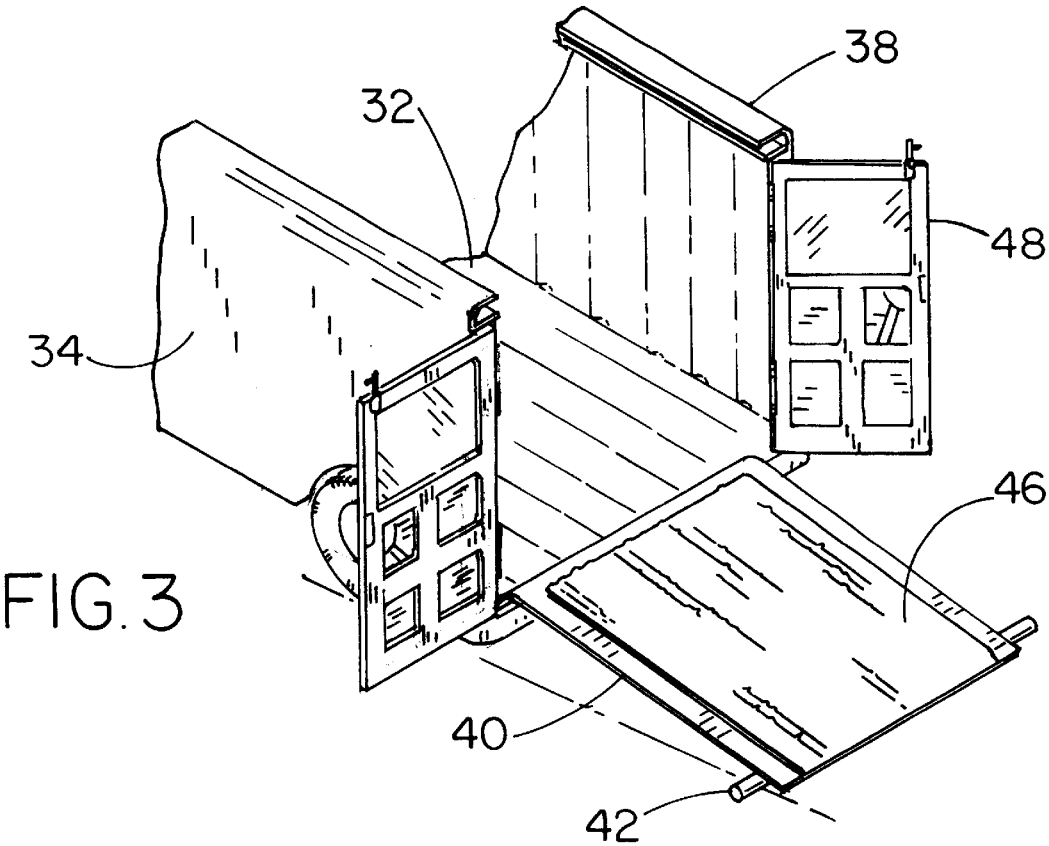
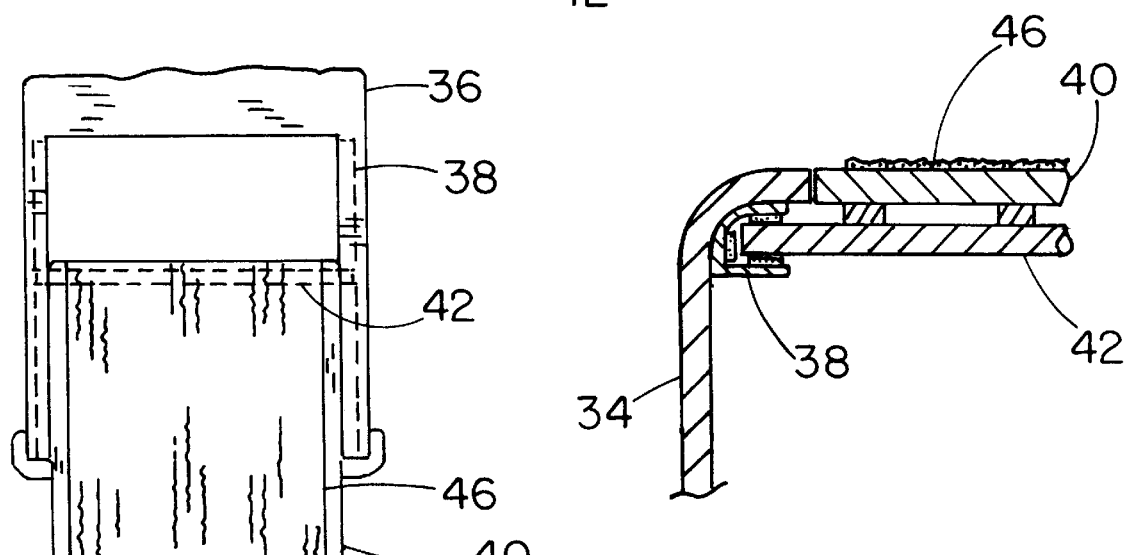

VEHICLE WITH AN ADJUSTABLE ROOF

BACKGROUND OF THE INVENTION

1. Field of the Invention

The present invention relates to vehicles and more particularly pertains to a new vehicle with an adjustable roof for providing a vehicle with enhanced capacity by permitting adjustment of the position of the roof of the vehicle.

2. Description of the Prior Art

The use of vehicles is known in the prior art. More specifically, vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,731,968; U.S. Pat. No. 3,186,756; U.S. Pat. No. 4,462,631; U.S. Pat. No. 2,602,693; U.S. Pat. No. 4,261,613; and U.S. Pat. No. Des. 109,521.

While these devices fulfill their respective, particular objectives and requirements, the aforementioned patents do not disclose a new vehicle with an adjustable roof. The inventive device includes an enhanced transport vehicle system, which comprises a vehicle having a front and a rear. The vehicle has a body including a cab portion located toward the front of the vehicle. The cab portion has a roof section. The body also includes a cargo portion extending rearwardly from the cab portion. The cargo portion has a floor and a pair of laterally spaced side walls extending upwardly in a substantially perpendicular orientation to the floor. The floor has a rear end, and the cargo portion has a roof section extending rearwardly from the roof section of the cab portion to a rear edge of the roof section. The side walls have upper edges extending substantially parallel to each other, and the upper edge of the side walls extend rearwardly from the rear edge of the roof section of the cargo portion. A roof portion is mounted on the cargo portion of the vehicle, and the roof portion has a front edge, a rear roof edge, and opposite lateral side edges extending between the front edge and rear roof edge. The roof portion is pivotable with respect to the roof section of the cargo portion of the vehicle.

In these respects, the vehicle with an adjustable roof according to the present invention substantially departs from the conventional concepts and designs of the prior art, and in so doing provides an apparatus primarily developed for the purpose of providing a vehicle with enhanced capacity by permitting adjustment of the position of the roof of the vehicle.

SUMMARY OF THE INVENTION

In view of the foregoing disadvantages inherent in the known types of vehicles now present in the prior art, the present invention provides a new vehicle with an adjustable roof construction wherein the same can be utilized for providing a vehicle with enhanced capacity by permitting adjustment of the position of the roof of the vehicle.

The general purpose of the present invention, which will be described subsequently in greater detail, is to provide a new vehicle with an adjustable roof apparatus and method which has many of the advantages of the vehicles mentioned heretofore and many novel features that result in a new vehicle with an adjustable roof which is not anticipated, rendered obvious, suggested, or even implied by any of the prior art vehicles, either alone or in any combination thereof.

To attain this, the present invention generally comprises an enhanced transport vehicle system, which comprises a vehicle having a front and a rear. The vehicle has a body including a cab portion located toward the front of the vehicle. The cab portion has a roof section. The body also includes a cargo portion extending rearwardly from the cab portion. The cargo portion has a floor and a pair of laterally spaced side walls extending upwardly in a substantially perpendicular orientation to the floor. The floor has a rear end, and the cargo portion has a roof section extending rearwardly from the roof section of the cab portion to a rear edge of the roof section. The side walls have upper edges extending substantially parallel to each other, and the upper edge of the side walls extend rearwardly from the rear edge of the roof section of the cargo portion. A roof portion is mounted on the cargo portion of the vehicle, and the roof portion has a front edge, a rear roof edge, and opposite lateral side edges extending between the front edge and rear roof edge. The roof portion is pivotable with respect to the roof section of the cargo portion of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle with an adjustable roof apparatus and method which has many of the advantages of the vehicles mentioned heretofore and many novel features that result in a new vehicle with an adjustable roof which is not anticipated, rendered obvious, suggested, or even implied by any of the prior art vehicles, either alone or in any combination thereof.

It is another object of the present invention to provide a new vehicle with an adjustable roof, which may be easily and efficiently manufactured and marketed.

It is a further object of the present invention to provide a new vehicle with an adjustable roof, which is of a durable and reliable construction.

An even further object of the present invention is to provide a new vehicle with an adjustable roof which is susceptible of a low cost of manufacture with regard to both materials and labor, and which accordingly is then susceptible of low prices of sale to the consuming public, thereby making such vehicle with an adjustable roof economically available to the buying public.

Still yet another object of the present invention is to provide a new vehicle with an adjustable roof which provides in the apparatuses and methods of the prior art some of the advantages thereof, while simultaneously overcoming some of the disadvantages normally associated therewith.

Still another object of the present invention is to provide a new vehicle with an adjustable roof for providing a vehicle with enhanced capacity by permitting adjustment of the position of the roof of the vehicle.

Yet another object of the present invention is to provide a new vehicle with an adjustable roof which includes an enhanced transport vehicle system, which comprises a vehicle having a front and a rear. The vehicle has a body including a cab portion located toward the front of the vehicle. The cab portion has a roof section. The body also includes a cargo portion extending rearwardly from the cab portion. The cargo portion has a floor and a pair of laterally spaced side walls extending upwardly in a substantially perpendicular orientation to the floor. The floor has a rear end, and the cargo portion has a roof section extending rearwardly from the roof section of the cab portion to a rear edge of the roof section. The side walls have upper edges extending substantially parallel to each other, and the upper edge of the side walls extend rearwardly from the rear edge of the roof section of the cargo portion. A roof portion is mounted on the cargo portion of the vehicle, and the roof portion has a front edge, a rear roof edge, and opposite lateral side edges extending between the front edge and rear roof edge. The roof portion is pivotable with respect to the roof section of the cargo portion of the vehicle.

Still yet another object of the present invention is to provide a new vehicle with an adjustable roof that allows unusually tall payloads to be transported without being laid on their sides.

Even still another object of the present invention is to provide a new vehicle with an adjustable roof that provides many of the benefits of vehicles without closed cargo sections such as pick-up trucks, while maintaining the advantages of vehicles with closed cargo sections such as cars and vans.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the present invention.

FIG. 4 is a schematic top view of the cargo portion of the present invention.

FIG. 5 is a schematic cross-sectional view of a portion of an upper side wall of the cargo portion of the present invention.

DESCRIPTION OF THE PREFERRED EMBODIMENT

Figure 1:
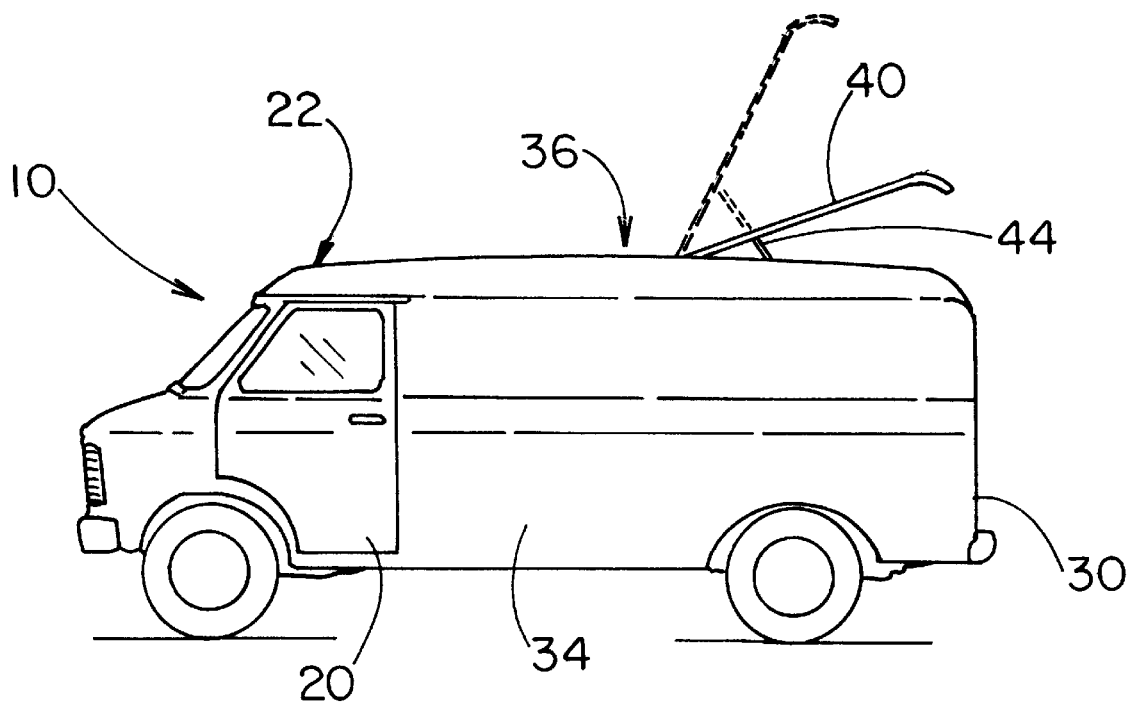
FIG. 1 is a schematic side view of a new vehicle with an adjustable roof according to the present invention.
Figure 2:
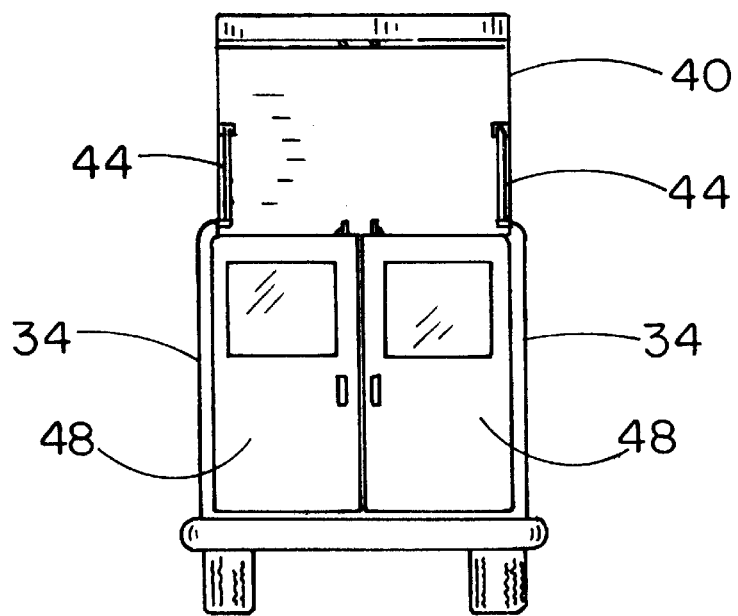
FIG. 2 is a schematic rear view of the present invention.

With reference now to the drawings, and in particular to FIGS. 1 through 5 thereof, a new vehicle with an adjustable roof embodying the principles and concepts of the present invention and generally designated by the reference numeral 10 will be described.

As best illustrated in FIGS. 1 through 5, the vehicle with an adjustable roof 10 generally comprises a vehicle with a front, a rear and a body. The body of the vehicle comprises a cab portion 20, a cargo portion 30 and a roof portion 40.

The cab portion 20 is located towards the front of the vehicle. The cab portion 20 has a roof section 22.

The cargo portion 30 extends rearwardly from the cab portion 20. The cargo portion 30 has a floor 32 and a pair of laterally spaced side walls 34. The side walls 34 extend upwardly from the floor 32 and are substantially perpendicular to the floor 32. The cargo portion 30 also has a roof section 36. The roof section 36 of the cargo portion 30 extends rearwardly from the roof section 22 of the cab portion 20 to a rear edge. The roof section 36 extends substantially parallel to the floor 32. The floor 32 has a rear end. The side walls 34 of the cargo portion 30 preferably extend upward to a height above the floor 32 substantially equal to the height of the roof section 36 above the floor 32. The side walls 34 have upper edges, which extend substantially parallel to each other. The upper edge of the side walls 34 extends rearwardly from the rear edge of the roof section 36 of the cargo portion 30. Each of the side walls 34 may have a mounting channel 38 adjacent to the upper edges of the side walls 34. The mounting channels 38 are in opposed relationship to each other.

The roof portion 40 is mounted on the cargo portion 30 of the vehicle. The roof portion 40 has a front edge, a rear roof edge, and opposite lateral side edges. The lateral side edges extend between the front edge and the rear roof edge. The roof portion 40 has a roof panel and a mounting rod 42. The mounting rod 42 is mounted adjacent to the front edge of the roof portion 40. The mounting rod 42 has rod ends which extend outwardly from the side edges of the removable roof portion 40.

In one embodiment, the roof portion 40 is pivotally mounted on the cargo portion 30. The ends of the rods 42 are pivoted on the mounting channels 38 for pivoting the rear roof edge upward from the upper edges of the side walls 34. Preferably, at least one biasing member 44 is provided for pivoting the roof portion 40 from a lowered position toward a raised position. The biasing member 44 is mounted on one of the upper edges of the side walls 34 and the roof portion 40. The biasing member 44 may comprise a pressurized piston and cylinder structure.

Optionally, the roof portion may be removably mounted on the cargo portion 30 of the vehicle. The mounting rods 42 are slidable in the mounting channels 38, allowing the removal of the roof portion 40 from the mounting on the side walls 34. The roof portion 40 has an upper surface. A traction material 46 has been applied to the upper surface of the removable roof portion 40.

The side walls 34 have a first length between the cab portion 20 and the rear ends of the side walls 34. The roof section 36 has a second length between the cab portion 20 and the rear edge of the roof section 36 of the cargo portion 30. In one embodiment of the invention, the first length is approximately twice the second length.

The cargo portion 30 may additionally comprise a door 48 which is pivotally mounted to one of the side walls 34. The door 48 is used to selectively close the opening defined between the rear end of the side walls 34 and the rear end of the floor 32. Optionally, a second door 48 may be included. Each of the two doors 48 is mounted to an associated one of the rear edges of the side walls 34.

Preferably, the roof portion 40 is designed to be positioned between the rear edge of the floor 32 of the cargo portion 30 and a ground surface below the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An enhanced transport vehicle system, comprising:
   a vehicle having a front and a rear, the vehicle having a body comprising:
   a cab portion located toward a front of the vehicle, the cab portion having a roof section;
   a cargo portion extending rearwardly from the cab portion, the cargo portion having a floor and a pair of laterally spaced side walls extending upwardly in a substantially perpendicular orientation to the floor, the floor having a rear end, the cargo portion having a roof section extending rearwardly from the roof section of the cab portion to a rear edge of the roof section, the side walls having upper edges extending substantially parallel to each other, the upper edge of the side walls extending rearwardly from the rear edge of the roof section of the cargo portion;
   a roof portion mounted on the cargo portion of the vehicle, the roof portion having a front edge, a rear roof edge, and opposite lateral side edges extending between the front edge and rear roof edge, the roof portion being pivotable with respect to the roof section of the cargo portion of the vehicles;
   a mounting channel mounted on each of the side walls adjacent to the upper edges of the side walls, the mounting channels being in opposed relationship to each other;
   said roof portion has a roof panel and a mounting rod mounted adjacent to the front edge of the roof portion, the mounting rod having rod ends extending outwardly from the side edges of the roof portion, said rook portion being removable;
   said roof portion is pivotally mounted on the cargo portion, the ends of the rods being pivotable in the mounting channels for pivoting the rear roof edge upwardly from the upper edges of the side walls.

2. The system of claim 1 wherein the roof section extends substantially parallel to the floor the side walls extending upwardly to a height above the floor substantially equal to a height of the roof portion above the floor.

3. The system of claim 1, additionally comprising at least one biasing member for biasing the roof portion from a lowered position toward a raised position, the at least one biasing member being mounted on one of the upper edges of the side walls and the roof portion, the biasing member comprising a pressurized piston and cylinder structure.

4. The system of claim 1, wherein the roof portion of the cargo portion is removably mounted on the cargo portion of the vehicle, the mounting rods being slidably in the mounting channels for permitting the removal of the roof portion from mounting on the side walls, the removable roof portion having an upper surface.

5. An enhanced transport vehicle system, comprising:
   a vehicle having a front and a rear, the vehicle having a body comprising:
   a cab portion located toward a front of the vehicle, the cab portion having a roof section;
   a cargo portion extending rearwardly from the cab portion, the cargo portion having a floor and a pair of laterally spaced side walls extending upwardly in a substantially perpendicular orientation to the floor, the floor having a rear end, the cargo portion having a roof section extending rearwardly from the roof section of the cab portion to a rear edge of the roof section, the side walls having upper edges extending substantially parallel to each other, the upper edge of the side walls extending rearwardly from the rear edge of the roof section of the cargo portion;
   a roof portion mounted on the cargo portion of the vehicle, the roof portion having a front edge, a rear roof edge, and opposite lateral side edges extending between the front edge and rear roof edge, the roof portion being pivotable with respect to the roof section of the cargo portion of the vehicle;
   wherein an upper surface of the roof portion having a traction-enhancing material applied thereon.

6. The system of claim 5 wherein the side walls have a first length between the cab portion and the rear ends of the side walls, and the roof section of the cargo portion has a second length between the cab portion and rear edge of the roof portion of the cargo portion, the first length being approximately twice the second length.

7. The system of claim 5 wherein the cargo portion additionally comprises a door pivotally mounted to one of the side walls for selectively closing the opening defined between the rear ends of the side walls and the rear end of the floor.

8. The system of claim 7 wherein a second door is included, and each of the doors being mounted on one of the rear edges of the side walls.

9. The system of claim 5 wherein the roof portion is adapted for positioning between the rear edge of the floor of the cargo portion and a ground surface below the vehicle.

10. An enhanced transport vehicle system, comprising:
    a vehicle having a front and a rear, the vehicle having a body comprising:

a cab portion located toward a front of the vehicle, the cab portion having a roof section;

a cargo portion extending rearwardly from the cab portion, the cargo portion having a floor and a pair of laterally spaced side walls extending upwardly in a substantially perpendicular orientation to the floor, the cargo portion having a roof section extending rearwardly from the roof section of the cab portion to a rear edge of the roof section, the roof section extending substantially parallel to the floor, the floor having a rear end, the side walls extending upwardly to a height above the floor substantially equal to a height of the roof portion above the floor, the side walls having upper edges extending substantially parallel to each other, the upper edge of the side walls extending rearwardly from the rear edge of the roof section of the cargo portion, a mounting channel mounted on each of the side walls adjacent to the upper edges of the side walls, the mounting channels being in opposed relationship to each other;

a roof portion mounted on the cargo portion of the vehicle, the roof portion having a front edge, a rear roof edge, and opposite lateral side edges extending between the front edge and rear roof edge, the roof portion having a roof panel and a mounting rod mounted adjacent to the front edge of the roof portion, the mounting rod having rod ends extending outwardly from the side edges of the roof portion, said roof portion being removable;

wherein the roof portion is pivotally mounted on the cargo portion, the ends of the rods being pivotable in the mounting channels for pivoting the rear roof edge upwardly from the upper edges of the side walls, at least one biasing member for biasing the roof portion from a lowered position toward a raised position, the biasing member being mounted on one of the upper edges of the side walls and the roof portion, the biasing member comprising a pressurized piston and cylinder structure;

wherein the roof portion of the cargo portion is removably mounted on the cargo portion of the vehicle, the mounting rods being slidably in the mounting channels for permitting the removal of the roof portion from mounting on the side walls, the removable roof portion having an upper surface, the upper surface of the removable roof portion having a traction-enhancing material applied thereon;

wherein the side walls have a first length between the cab portion and the rear ends of the side walls, and the roof section has a second length between the cab portion and rear edge of the roof portion of the cargo portion, the first length being approximately twice the second length;

wherein the cargo portion additionally comprising a door pivotally mounted to one of the side walls for selectively closing the opening defined between the rear ends of the side walls and the rear end of the floor, wherein a second door is included, and each of the doors being mounted on one of the rear edges of the side walls; and wherein the roof portion is adapted for positioning between the rear edge of the floor of the cargo portion and a ground surface below the vehicle.

* * * * *